United States Patent [19]
Rankl

[11] 3,778,246
[45] Dec. 11, 1973

[54] MULTI-PART MOLD WITH MEANS FOR ALIGNING MOLD PARTS

[75] Inventor: Josef Rankl, Zwiesel, Germany

[73] Assignee: Vereinigte Farbenglaswerke Aktiengesellschaft, Zwiesel (Niederbayern), Germany

[22] Filed: Apr. 27, 1972

[21] Appl. No.: 248,250

Related U.S. Application Data

[63] Continuation-in-part of Ser. No. 16,909, March 5, 1970, abandoned.

[30] Foreign Application Priority Data
Mar. 7, 1969 Germany................. P 19 11 600.8

[52] U.S. Cl.................. 65/360, 65/167, 65/DIG. 10
[51] Int. Cl............................................... C03b 9/04
[58] Field of Search..................... 65/167, 357, 358, 65/359, 360, DIG. 10

[56] References Cited
UNITED STATES PATENTS

| 2,006,056 | 6/1935 | McNamara | 65/360 |
| 879,294 | 2/1908 | Miller | 65/357 |
| 3,472,639 | 10/1969 | Mumford | 65/359 X |

Primary Examiner—Arthur D. Kellogg
Attorney—Ralph D. Dinklage et al.

[57] ABSTRACT

A multipart mold in which at least two mold parts are mounted on hingedly connected arms for movement into and out of the molding position. In molding position, the parts form an annular body having an open bottom. The mold parts have projection-recess combinations for providing horizontal and vertical alignment of the mold parts. A bottom closure is provided, having a flange for receiving the lower edges of said mold parts and which cooperate with the projection-recess combinations to provide improved and distributed alignment of the mold parts.

6 Claims, 4 Drawing Figures

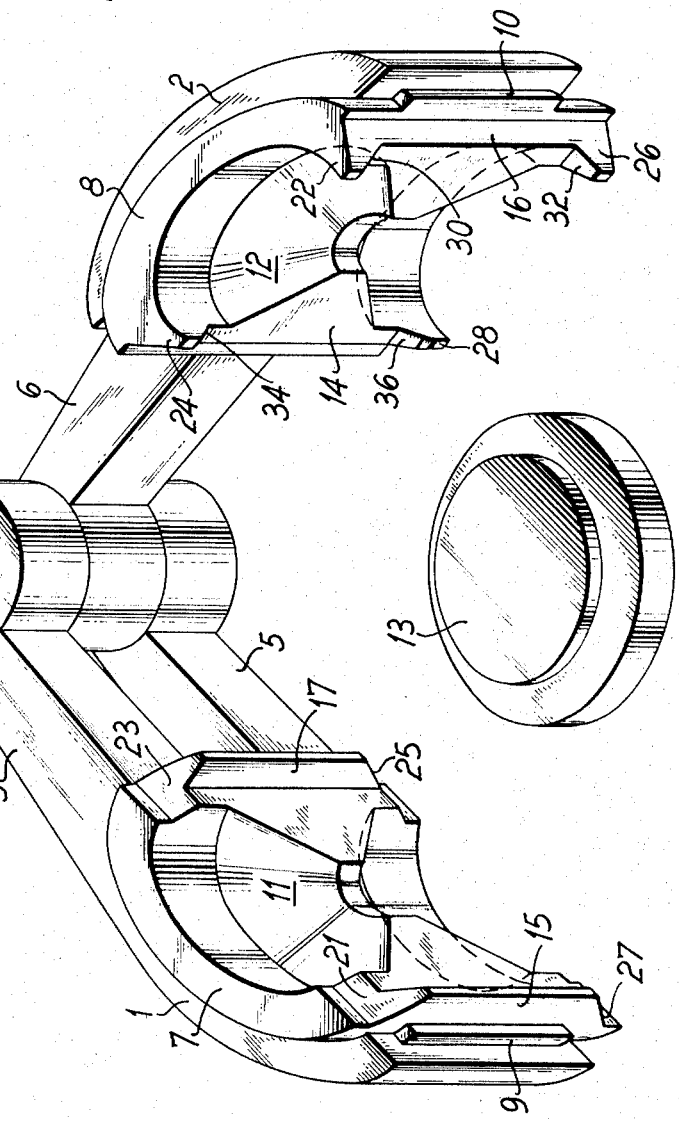

MULTI-PART MOLD WITH MEANS FOR ALIGNING MOLD PARTS

This application is a continuation-in-part of Ser. No. 16,909, filed Mar. 5, 1970 now abandoned.

BACKGROUND

The invention relates to a mold of multiple parts for the molding or blow-molding of e.g. thermoplastic materials, especially glass. If the external shape of the object being produced --a molding for example--has undercuts in the direction of its long axis, the mold must be divided into at least two halves. The halves can be mounted so that they can be pivoted about a common hinging means. Thus when the halves are swung together they form the cavity, which is closed at the sides and bottom, for receiving the gather of, for example, molten glass, and when they are again swung apart they permit the removal of the object that is produced by the molding process.

To facilitate rapid changeover from one mold to another, the molds are designed for easy replacement, in that each half is inserted into a mold holder and can easily be removed from the mold holder and replaced with an insert having a differently shaped internal cavity.

Owing to gaps between the planes of contact between the inserts in the closed state, which cannot be entirely avoided, a more or less visible or perceptible seam is formed on the products, i.e., on the moldings. The size of the gap depends on the accuracy of the mold parts and their distortion due to temperatures that develop during the molding. The formation of fins at the seams due to horizontal off-set of the halves is minimized in part due to the fact that the mutual contact surfaces of the two halves of the mold are made in inclined planes so that the one half can penetrate into the other to a certain extent, the two halves are guided against one another and in one another. Thus alignment in a direction perpendicular to the mold axis is provided.

Much more difficult is the precise positioning of the mold halves in the axial direction. An especially precise mutual alignment in the axial direction is desirable, because very pronounced seams are produced on the surfaces of molded glass products having planes which are perpendicular or at an angle to the mold axis, when the mold halves are displaced in the axial direction from their correct position.

The danger of such undesirable displacement is especially apparent from the following considerations:

1. The inserts have to be easily exchangeable in the mold holders, and therefore axial clearance is provided.

2. The mold halves must have clearance between the surfaces which are in contact during pivoting about the hinge axis, since easy pivoting on the hinges without binding is desirable.

These necessary and unavoidable clearances produce the undesirable mutual axial displacement of the contours of the mold halves and result in the formation of fins at surfaces which are perpendicular or at an angle to the mold axis.

The invention is directed to the problem of achieving a positive axial alignment and improved horizontal alignment of the contours of mold inserts and thus of the mold inserts themselves, in spite of the above-described clearances between the mold holders and the mold inserts and between the hinge parts.

For the solution of this problem, it is already in the prior art to prevent displacement in an axial direction by providing pins in the one mold insert and matching holes in the other. These pins and holes have the decided disadvantage that they are subjected to extreme wear in the opening and closing action of the mold, which often is performed under high temperatures, and consequently they soon fail to perform their function. Furthermore, they are highly liable to mechanical damage which can very often be produced, as is known, in the molding of glass.

THE INVENTION

According to the invention the problem is solved without the above-described disadvantages in that one or more projections, e.g. prismatic projections, are provided on the mold inserts, which engage without free play in matching recesses in the opposite mold parts when the mold is closed. Additionally, the mold includes a bottom closure member contoured to provide a recess for receiving the bottom edge portions of the inserts. The mold insert projections and recesses, and the contoured bottom closure member cooperate to provide suitable axial and horizontal alignment of the mold parts so that objectionable flashing or fins on the molded articles are avoided.

More particularly, the invention provides a multipart mold comprising working mold parts movable into and out of mating arrangement in which the working mold parts are assembled forming an annular body and a cavity for the molding. A projection, which may be of prismatic form, is provided on one of the mold parts and extends over annular width thereof. On the adjacent mold part toward which said projection extends, a recess is provided for receiving said projection, for accurate axial alignment of the last-mentioned two mold parts with the mold parts assembled.

It is desirable for the planes of the surfaces on one or both sides of the projections to be inclined or at a slant to the mold axis, and for the recesses to have matching surfaces which are also placed at a slant to the axis of the mold.

The contoured bottom closure member, having a peripheral recess for receiving the bottom edge portions of the inserts cooperates with the mentioned projections and recesses to distribute clearance between the mold parts with the result that fins and flashing are eliminated or reduced significantly in size.

The invention makes possible a very snug joining together of the joining planes in the molds and thus a nearly complete elimination of fins on the surfaces of the product—the molded object, for example.

The described embodiments of the invention have proven to be especially practical. By this technique, for example, molded stems and feet for goblets have been produced, in which the mold seams are virtually invisible. If desired fins and flashing can be further reduced by resorting to polygon rather than cylindrical cross sectional forms for the molded articles and constructing the mold so that parting lines of the mold are disposed along lines forming an edge of the polygon forms.

Thus the invention provides a multipart mold comprising two working mold parts removably mounted on hinged arms, thereby movable into and out of mating arrangement in which the two parts form an annular body having an open bottom. A projection-recess combination on the mold parts meshes to provide horizontal alignment, i.e. alignment perpendicular to the mold axis; and a second projection-recess combination on the mold parts meshes to provide axial alignment. A bottom closure member has a lower flange providing horizontally extending and vertically extending surfaces for engagement with the bottom portions of the mold parts to cooperate with the first and second projection-recess combinations to provide improved and better distribution of alignment both horizontally and vertically.

Two embodiments are represented schematically in the annexed drawing, in which:

FIG. 1 shows a perspective view of a complete molding device with slanting or inclined guide surfaces on the aligning elements; and FIGS. 2a and 2b show an arrangement in which the guiding surfaces are perpendicular to the mold axis.

In the drawings, like reference characters refer to corresponding parts.

Figure 3:
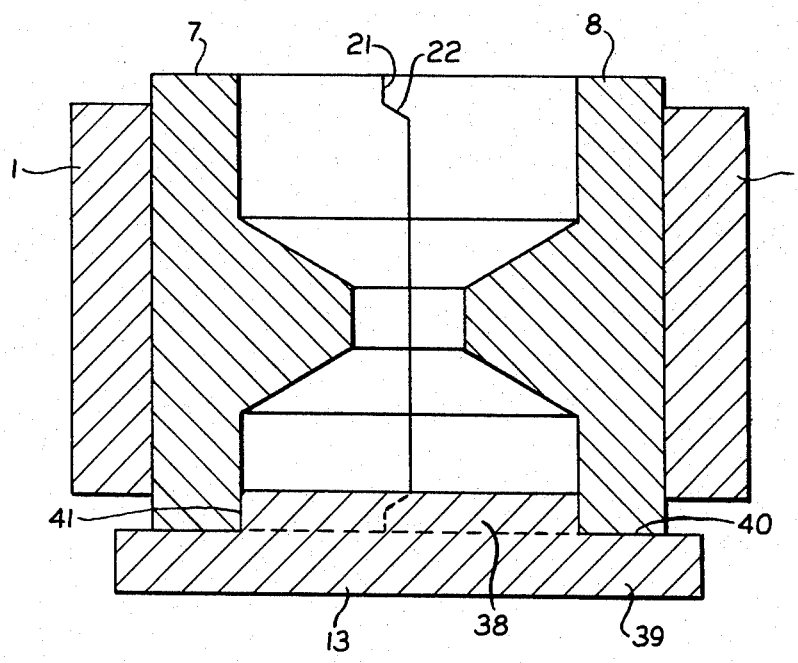
FIG. 3 is a cross-sectional view of the mold in the closed position.

The cupped mold holder 1 is joined to the hinge system by two arms 3 and 5. The center part of this hinge is formed by the mold holder arm 6, which in turn is a part of the cupped mold holder 2. The two mold holders are rotatably joined together by the hinge pin 4. Between the hinge parts there is provided free play in the direction of the hinge pin axis owing to the necessity of easy pivotability.

Working mold parts, in the form of mold inserts 7 and 8, are inserted into the cupped mold holders 1 and 2. On its outside surface each insert has an approximately semicircular raised portion 9 and 10, respectively, to engage matching recesses in the mold holders. Clearance must be provided between the raised portions on the mold inserts and the recesses in the mold holders so as to provide for easy removal and replacement.

The mold inserts themselves have cavities 11 and 12 whose common contours correspond to the object that is to be molded. On a base plate which is now shown there is mounted a stationary mold bottom 13 which is encompassed sealingly by the mold inserts when the mold is closed. See FIG. 3.

The mold insert 7 represented on the left side in FIG. 1 has elongated projections 15 and 17 extending parallel with the axis on both of the longitudinal sides and provided with slanting inner surfaces on one side, which engage matching surfaces 14 and 16 on the right mold insert. This lengthwise arrangement prevents displacement of the mold inserts against one another in a horizontal direction, i.e. perpendicular to the mold axis, when the mold is closed. It is generally in the prior art and is not a subject of the invention, so that further description is unnecessary.

In FIG. 2b there is shown a guiding projection 18 created on the mold insert 8, the inside surface 20 of said projection being flat and perpendicular to the mold axis. This guiding projection engages a cut 19 milled into the mold insert 7 (FIG. 2a). When the mold is closed, flat surface 20 of the mold insert 8 lies against the matching flat surface 29 of cut 19 in mold insert 7 in such a manner that the effect of axial play between the mold inserts and the mold holders and the axial play in the hinge is substantially diminished.

The prismatic projection 18 and the perpendicular cut 19 can be provided at only one point, at adjacent free ends of two of the mold parts as shown in FIGS. 2a and 2b, or another set of these elements can also be provided on the hinge side of the mold inserts, or these elements can be duplicated on the lower end of the mold inserts so that there are such elements in the upper and lower ends as shown in FIG. 1.

The arrangement represented in FIG. 1 is still more effective. In this case, the guiding elements 22, 24, 26 and 28 are provided with inclined or slanting surfaces 30, 32, 34 and 36, which come in contact with the inclined or slanting surfaces 21, 23, 25 and 27 on mold insert 7 when the mold is closed. The slanting configuration of these guiding means permits the complete elimination of undesirable axial play.

Mold bottom 13, as shown in FIG. 3, is composed of a short centrally disposed body portion 38, and lower peripheral flange 39, thus providing a recess defined by horizontally extending plane 40 and vertically extending plane 41. With the mold in closed condition as shown in FIG. 3, the horizontally extending plane 40 cooperates with the means such as prismatic projections-recesses 22, 21, to provide improved and distributed axial alignment, while the vertically extending plane 41 cooperates with the means such as the elongated projections-recesses 15, 16 (FIG. 1) to do likewise for alignment in a direction perpendicular to the mold axis.

The form of construction represented in the drawing relates to a bipartite mold design. In the case of particularly complicated molds, mold designs are also known which have a plurality of hinge systems and consist of more than two mold halves. The features described according to the invention are, of course, also applicable to mold designs such as those.

The invention is also applicable to a mold design in which the mold holder and mold insert consist of one piece.

The recess, such as recess 21 (FIG. 1) for receiving the projection 22, can extend over annular width of the working mold part 7, as the projection 22 extends over annular width of the working mold part 8, or recess 21 can extend radially outwardly from the inner surface of mold part 7 a distance such that there is no interference or contacting between the radically outwardly disposed surface of projection 22 and the recess 21, when assembling the mold parts.

What is claimed is:

1. Multipart mold comprising:
   a. working mold parts removably mounted in holders mounted on arms hingedly connected together providing the working mold parts, movable into and out of a mating arrangement in which the working mold parts are assembled forming an annular body having an open bottom,
   b. means for horizontally aligning the working mold parts, comprising a projection on one of the working parts and a recess for receiving the projection on the other of the mold parts for meshing of the projection and recess to provide alignment of working mold parts perpendicularly of the mold axis when the working parts are in said mating arrangement,
   c. means for vertically aligning the working mold parts, comprising a second projection on one of the working parts and a second recess for receiving the second projection on the other of the mold parts, for meshing of the second projection and second recess to provide alignment of the working mold parts axially of the mold axis when the working mold parts are in said mating arrangement, a surface of the second projection contacting a surface of the second recess, said contacting surfaces being flat and inclined to the axis of the mold, d. a one piece bottom closure having a lower peripheral flange defined by a horizontally extending surface and a vertically extending surface, said horizontally extending surface cooperating with said vertically aligning means, and said vertically extending surface cooperating with said horizontally aligning means to provide improved and distributed alignment of the mold parts.

2. Multipart mold according to claim 1, vertically aligning means as aforesaid being disposed at the upper and lower ends of said working mold parts.

3. Multipart mold according to claim 1, vertically aligning means as aforesaid being disposed at the upper and lower ends on each side of said working mold parts.

4. Multipart mold according to claim 1, the projections for vertical alignment being a prismatic projection.

5. Multipart mold according to claim 2, the projections for vertical alignment being prismatic projections.

6. Multipart mold according to claim 3, the projections for vertical alignment being prismatic projections.

* * * * *